Patented Aug. 24, 1954

2,687,430

UNITED STATES PATENT OFFICE 2,687,430

POLYOXYALKYLENE DERIVATIVES OF XYLYLENE GLYCOL

John E. Snow, Hasbrouck Heights, and Robert H. Barth, Ridgewood, N. J., assignors to Heyden Chemical Corporation, New York, N. Y., a corporation of Delaware No Drawing. Application August 10, 1951, Serial No. 241,382

6 Claims. (Cl. 260—488)

This invention relates to new and novel organic compounds, and more particularly, to hydroxyalkyl ethers of p-xylylene glycol, derivatives thereof and to methods for the preparation of these new compositions of matter.

It has now been discovered that hydroxyalkyl ethers of p-xylylene glycol which may be represented by the following formula:

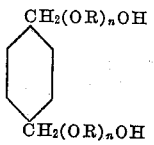

wherein R is an alkylene group and $n$ is an integer ranging from 1 to 20 can be prepared by directly reacting p-xylylene glycol and an alkylene oxide under pressure in the presence of a small amount of metallic sodium, the reaction being conducted in a suitable solvent medium. The substantially pure hydroxyalkyl ether compound in high yield is then recovered from the reaction mixture.

In a more specific embodiment of this invention, a mixture containing about 1 mol of p-xylylene glycol, at least 2 mols of an alkylene oxide such as for example ethylene oxide, metallic sodium, and a suitable solvent, are heated over an extended period of time at a temperature ranging between 140°–170° C. until the reaction is substantially completed. The reaction mixture is then cooled to room temperature during which time a separation into two layers occurred. The ether-containing layer was filtered and the solvent was removed from the filtrate by distillation under reduced pressure. The hydroxyalkyl ether in substantially high yield and high purity was thus separated and recovered.

Other alkylene oxides such as for example, propylene oxide, butylene oxide, etc. may be similarly used in the preparation of the corresponding hydroxyalkyl ethers.

The above described reaction may be represented by the following equation:

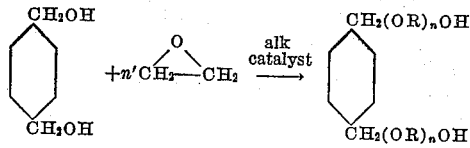

Wherein $n$ equals 1 to 20 and $n'$ is an integer varying from 2 to 40

In a modification of the procedure described above, the hydroxyalkyl ethers can likewise be prepared by reacting p-xylylene glycol and ethylene chlorohydrin in the presence of sodium hydroxide.

It should be mentioned that when larger mol ratios of an alkylene oxide are used in the reaction; that is, 4 or 6 mols or more of alkylene oxide per mol of p-xylylene glycol, correspondingly longer polyglycol chain compounds are obtained.

By reacting the hydroxyalkyl ethers of p-xylylene glycol thus produced with an excess of an organic acid, acid chloride or acid anhydride at an elevated temperature, esters designated by the following formula:

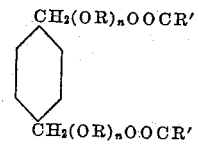

wherein R is an alkylene group, R' is an alkyl or aryl group and $n$ is an integer varying from 1 to 20 can be produced.

The acids which can be used, for example, to esterify the hydroxyalkyl ethers include such fatty acids as acetic acid, propionic acid, lauric acid, stearic acid, and other straight or branched-chain fatty acids such as phenylacetic, 2-ethylhexoic, etc. and such aromatic acids as benzoic acid, toluic acid, salicylic acid, etc. Likewise esterification with mono-esters of dicarboxylic acids such as for example, mono-ethyl phthalate can also be effected. When the hydroxyalkyl ethers are reacted or condensed with di-carboxylic acids such as for example, maleic, succinic, phthalic and other acids of this type, high boiling resinous esters are obtained.

It is obvious that valuable derivatives of the hydroxyalkyl ethers set forth herein can be prepared, such as for example, the esters, including partial esters and mixed esters. The derivatives thus prepared are extremely useful as plasticizers for a wide variety of resins and cellulose derivatives, notably the vinyl resins and nitrocellulose with which they are compatible and in which they serve to plasticize, soften, elasticize, lubricate, and otherwise modify these compounds. The resulting compositions may be molded under pressure, dissolved in solvents to form coating compositions, extended to form ribbons, fibers or structural shapes, emulsified, or otherwise prepared to be used as textile assistants, etc.

The plasticizers may be incorporated with the aforementioned ingredients according to methods well known in the art, such as for example by dissolving in a mutual solvent and subsequently evaporating the solvent, by kneading at an elevated temperature, if desired, and conveniently in a machine of the Banbury mixer type, by milling on differential rolls, etc. Mixed esters of hydroxyalkyl ethers of p-xylylene glycol such as propionate-butyrate, butyrate-acetate are likewise good plasticizers being compatible with a wide variety of plastic and film forming materials. Mixed esters of the hydroxyalkyl ethers containing a long chain acid radical and a short chain acid radical, such as for instance propionate - stearate, propionate-laurate, butyrate-stearate, etc. may well serve as both a lubricant and a plasticizer, a substance much to be desired in the molding art, and especially in injection molding.

It is apparent that the hydroxyalkyl ethers of p-xylylene glycol and esters, partial esters, etc. of the hydroxyalkyl ethers of p-xylylene glycol which can be prepared by the methods indicated supra, include a wide variety of compounds in addition to those indicated because of the obvious possibilities offered by the reactive hydroxy groups of the starting compound, p-xylylene glycol, and also in view of such other factors as the extent of the esterification of the hydroxy groups of the hydroxyalkyl ethers, that is, esterification of one or both of the hydroxy groups of the ethers, the nature of the various acids used in the esterification process, etc.

The following examples are illustrative of the particular compounds and concentrations employed in preparing hydroxyalkyl ethers of p-xylylene glycol and esters of these hydroxyalkyl ethers, but are not to be construed as limiting since many variations may be made therein without departing from the spirit and scope of the invention:

EXAMPLE I

*Diether of p-xylylene glycol and ethylene oxide*

A mixture of 134 grams (1 mol) of p-xylylene glycol, 194 grams (4.4 mols) of ethylene oxide, 468 grams of dry xylene, and 1 gram of sodium was placed in a silver-lined, 2 liter rocker bomb. The bomb was heated while rocking to a temperature of 150° C. and was maintained for 4 hours at a temperature ranging from 130°–160° C. On cooling to room temperature, the reaction mixture separated into two layers. After the layers had been separated, the lower layer containing the desired product was filtered, the solvent being removed from the filtrate by distillation under reduced pressure.

The product was a brown liquid which had a hydroxyl content of 11.1% (calculated for the ether—10.8% OH). A 96.8% yield of the compound was obtained.

The reaction described above can be represented by the following equation:

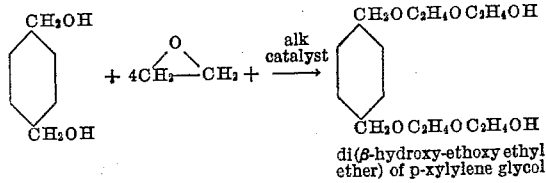

di($\beta$-hydroxy-ethoxy ethyl ether) of p-xylylene glycol

EXAMPLE II

*Diether of p-xylylene glycol and propylene oxide*

A mixture of 134 grams (1 mol) of p-xylylene glycol, 256 grams of propylene oxide, 468 grams of dry xylene, and 1 gram of sodium was placed in a silver-lined, 2 liter rocker bomb. The bomb was heated while rocking to a temperature of 150° C. and was maintained for 4 hours at a temperature ranging from 130°–160° C. On cooling to room temperature, the reaction mixture separated into two layers. After the layers had been separated, the lower layer containing the desired product was filtered, the solvent being removed from the filtrate by distillation under reduced pressure.

The diether prepared in the manner indicated above can be represented by the following formula:

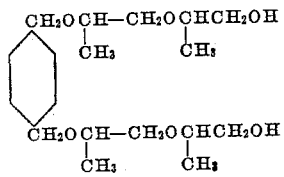

EXAMPLE III

The dipropionate ester of the ether prepared in Example I above which can be represented by the following formula:

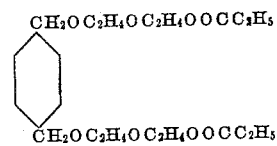

is prepared as follows:

200 grams of the hydroxyalkyl ether prepared in Example I and 334 grams of propionic anhydride were heated together at reflux temperature for 8 hours. The excess anhydride was removed under reduced pressure from the product which was then heated at 100°–120° C. at 1 mm. for an hour.

The product, which was obtained in a 97% yield, had a saponification value of 4.57 ml. N/1 NaOH/gram (calculated—4.72) and an acid number of 1.09 mg. KOH/gram.

Whereas this example illustrates a method for the preparation of the dipropionate ester of the hydroxyalkyl ether prepared in Example I, it is also quite possible to prepare in a similar manner, the dibutyl ester and also to prepare partial esters, i. e. monoesters, and likewise, mixed esters, i. e. different ester groups such as for example a propionate-butyrate ester, can also be prepared by conventional methods.

Reaction of the numerous hydroxyalkyl ethers of p-xylylene glycol with other saturated acids such as butyric, stearic, lauric, etc. or aromatic acids will similarly produce the corresponding esters. The esterification can be carried out by any suitable method which can be selected from methods well known in the art.

While modifications of the above invention have been described, it is to be understood that many variations of these ethers and esters are possible, since various permutations and combinations may easily be effected by one skilled in the art. Insofar as these modifications or changes are within the scope of the appended claims, they are to be considered as part of this invention.

We claim:

1. A chemical compound having the structural formula

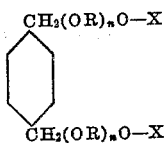

wherein R represents an alkylene radical, $n$ is an integer within the range of 2 to 10, and X represents a member of the group consisting of hydrogen and an acyl radical.

2. A chemical compound having the structural formula

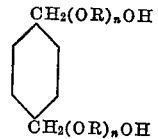

wherein R represents an alkylene radical and $n$ is an integer within the range of 2 to 10.

3. A chemical compound having the structural formula

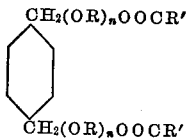

wherein R represents an alkylene group, R' represents an alkyl group, and $n$ is an integer within the range of 2 to 10.

4. A chemical compound having the structural formula

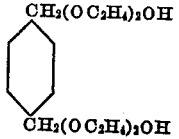

5. A chemical compound having the structural formula

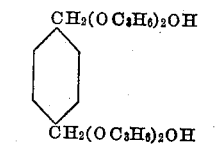

6. A chemical compound having the following structural formula:

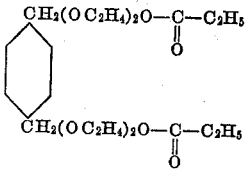

References Cited in the file of this patent

UNITED STATES PATENTS

| Number | Name | Date |
|---|---|---|
| 2,069,336 | Schmidt et al. | Feb. 2, 1937 |
| 2,139,369 | Kyrides | Dec. 6, 1938 |
| 2,372,615 | Thomas | Mar. 27, 1945 |